United States Patent [19]

Altmeyer et al.

[11] Patent Number: 4,710,078

[45] Date of Patent: Dec. 1, 1987

[54] DEVICE FOR THE INTERNAL DEBURRING OF A PIPE

[75] Inventors: Werner Altmeyer, Völklingen; Ewald Jakobs, Bous; Friedrich Meier, Remscheid, all of Fed. Rep. of Germany

[73] Assignee: TechnoARBED Deutschland GmbH, Saarbrucken-Burbach, Fed. Rep. of Germany

[21] Appl. No.: 686,196

[22] Filed: Dec. 26, 1984

[30] Foreign Application Priority Data

Dec. 27, 1983 [DE] Fed. Rep. of Germany ....... 3347146

[51] Int. Cl.⁴ .............................................. B23D 1/08
[52] U.S. Cl. .................................. 409/233; 407/113; 407/114
[58] Field of Search ............... 409/139, 140, 297, 298, 409/299, 309; 82/82; 83/914; 407/7, 113, 114; 408/713

[56] References Cited

U.S. PATENT DOCUMENTS

| 3,395,614 | 8/1968 | Dodson | 409/299 |
| 3,834,275 | 9/1974 | Newland | 409/299 |
| 4,138,925 | 2/1979 | Schulte | 409/299 |
| 4,225,274 | 9/1980 | Katz | 408/713 |
| 4,358,231 | 11/1982 | Meier | 409/299 |

FOREIGN PATENT DOCUMENTS

| 679254 | 9/1952 | United Kingdom | 409/298 |
| 373050 | 6/1973 | U.S.S.R. | 409/299 |
| 719810 | 3/1980 | U.S.S.R. | 409/299 |

Primary Examiner—Gil Weidenfeld
Assistant Examiner—Daniel W. Howell
Attorney, Agent, or Firm—Toren, McGeady & Associates

[57] ABSTRACT

A device for the internal deburring of a pipe or shaped tubular member, such as for removing the inwardly projecting portion of an axially extending seam, includes a support body elongated in the axial direction of the pipe. A cutting ring is clamped externally to the support body adjacent one of its ends. The cutting ring has an axis extending transversely of the axis of the pipe. The support body is constructed so that the cutting ring can turn in the rotational direction around the axis of the pipe.

3 Claims, 9 Drawing Figures

U.S. Patent    Dec. 1, 1987    Sheet 1 of 2    4,710,078
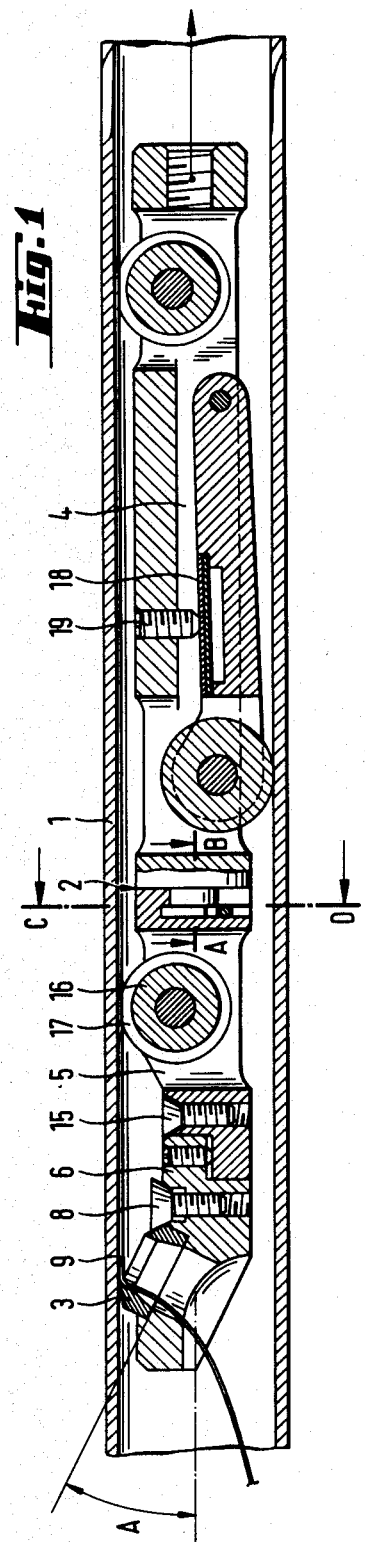
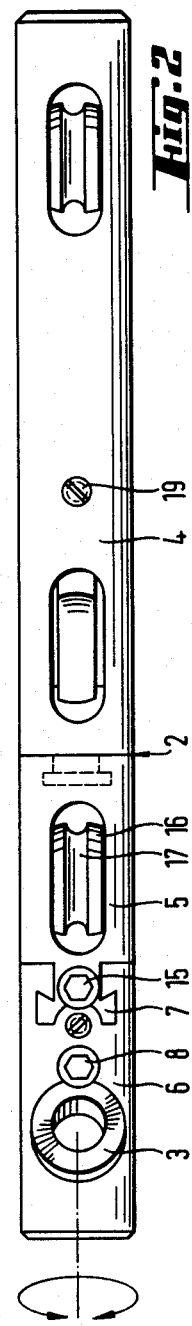
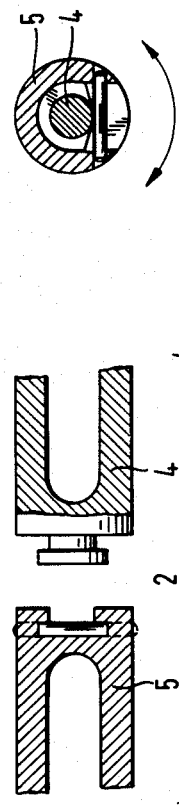
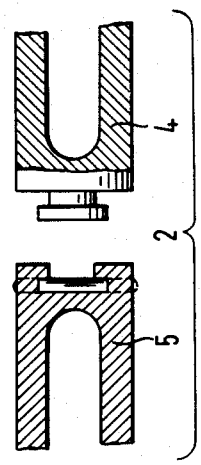

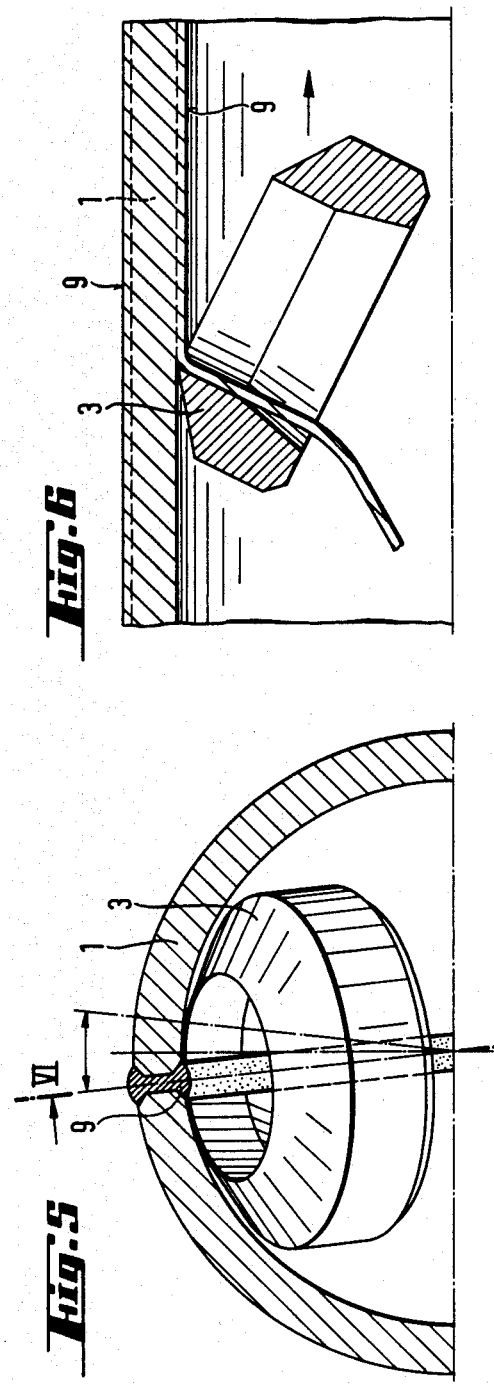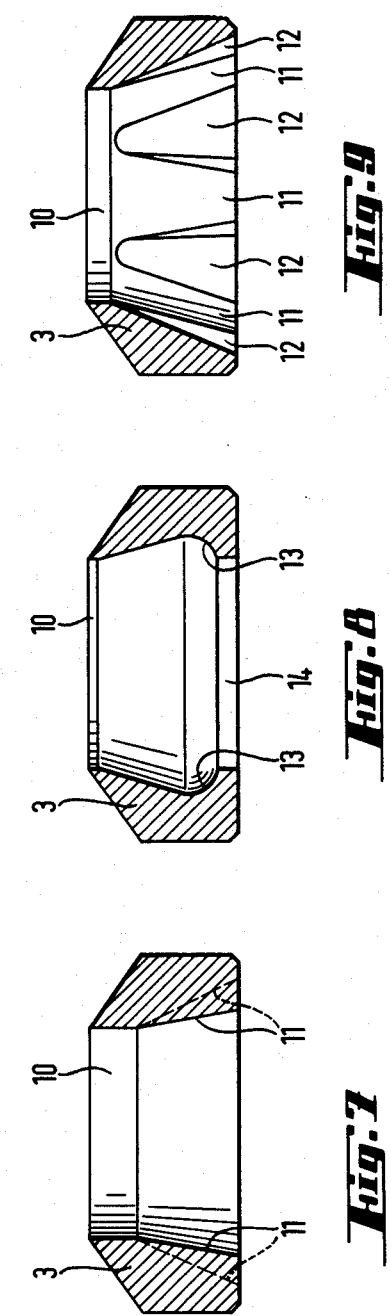

DEVICE FOR THE INTERNAL DEBURRING OF A PIPE

BACKGROUND OF THE INVENTION

The present invention is directed to a device for the internal deburring of an axially elongated pipe or shaped tubular member having an axially extending welded seam with a portion of the seam projecting into the interior of the pipe or tubular member. The device includes a support body elongated in the axial direction, that is, the cutting direction of the device. A cutting ring is mounted on the support body adjacent one end.

In a similar known device disclosed in U.S. Pat. No. 4,358,231 a fixed cutting ring is mounted on an elongated main support body so that it can be moved relative to a longitudinal seam in the pipe. This arrangement does not afford optimum deburring, particularly if increased surface roughness conditions are present or if the inwardly projecting seam extends obliquely of the axial direction of the pipe. In this device a relatively great wear of the cutting ring has been noted.

In another known device, disclosed in the Federal Republic of Germany Patentschrift No. 26 53 236, the carrier for the cutter is movable, but only for the purpose of adjusting the cutter. Any adjustment out of the axial line of the pipe is effected by means of a screw and clamping the carrier with a clamping screw. During the deburring process the carrier for the cutter is fixed to the rest of the device.

SUMMARY OF THE INVENTION

Therefore, the primary object of the present invention is to provide an improvement on the previously known similar devices so that the device can be guided during the cutting or deburring operation whereby there is a minor degree of wear of the cutting ring.

In accordance with the present invention, the cutting ring is positioned so that its axis extends transversely of the cutting direction or of the axial direction of the pipe and the cutting ring is mounted on the support body so that it can be turned in the rotational direction around the axis of the pipe.

Another feature of the invention is the arrangement of the support body as a stationary part and a rotatable part mounted on one end of the stationary part. The cutting ring is secured on a replaceable cutting ring carrier secured to the rotatable part of the support body.

Preferably, the connection between the cutting ring carrier and the rotatable part of the support body is a dovetailed connection.

Another significant feature of the invention is the attachment of the cutting ring to the carrier using a screw in engagement with the exterior surface of the cutting ring.

By clamping the cutting ring on its exterior, it is possible to design it to meet the existing conditions. Preferably, the interior of the cutting ring is shaped for the optimum removal of the material stripped by the cutting ring.

Preferably, the cutting ring is arranged generally horizontally or, to put it another way, its central axis extends upwardly approaching the vertical. It has been found to be advantageous if the opposite surface on the cutting ring from the cutting edge is located in a plane disposed at an angle of 20° to 30° to the axis of the pipe or tubular member, that is, where the axis is arranged horizontally.

Among the advantages achieved by the present invention is that the cutting edge on the cutting ring is self-adjusting so that it follows the inside burr or projection of the welded seam affording a smooth cut and a longer service life for the cutting ring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending sectional view of the device embodying the present invention;

FIG. 2 is a plan view of the device shown in FIG. 1 without the illustration of the pipe;

FIG. 3 is a sectional view taken along the line A-B showing the parts, connected in FIG. 1, separated from one another;

FIG. 4 is a cross-sectional view taken along the line C-D in FIG. 1;

FIG. 5 is a sectional view of the pipe and a perspective view of the cutting ring showing the operation of the device;

FIG. 6 is a sectional view taken in the axial direction of the pipe showing the cutting ring removing the inside bead of the weld seam on the pipe;

FIGS. 7, 8 and 9 are cross-sectional views of different embodiments of the cutting ring.

DETAILED DESCRIPTION OF THE INVENTION

In FIG. 1 an axially extending section is shown of a pipe or tubular member 2 with an inwardly projecting bead 9 of a weld seam extending in the axial direction along the inside surface of the pipe. A support body 2 is located within the pipe 1, the support body has a first end, the left end as viewed in FIG. 1 and a second end, the right end as viewed in FIG. 1. A cutting ring 3 is mounted adjacent the first end of the support body 2 and the central axis of the ring extends generally upwardly transverse to the axial direction of the pipe. The cutting ring has a lower surface, on the opposite side from the cutting edge in contact with the weld bead 9, which is located at an acute angle relative to the axis of the pipe. As illustrated in FIGS. 1, 2, 3 and 4, the support body 2 is divided into a stationary part 4 forming the second end of the support body and a movable part 5, forming the first end of the support body, and turnable about the axis of the pipe relative to the stationary part. The movable part 5 can be turned about the axis of the pipe such as is shown by the arrow in FIG. 4. The movable part 5 includes a cutting ring carrier 6 which forms the first end of the device. The carrier 6 is connected to the movable part 5 by a dovetail connection 7.

Cutting ring 3 is mounted in the carrier 6 and is secured by a screw 8 which can be tightened into a borehole in the carrier. The screw 8, as can be seen in FIGS. 1 and 2, is in contact with the surface of the cutting edge on the cutting ring. Unlike the known devices where the cutting ring is secured internally by a claw-like clamp, in the present arrangement, as can be seen in FIGS. 1 and 2, the open space defined within the cutting ring is clear of any interference so that an effective removal of the material trimmed by the cutting ring can take place through the ring. The passage of the material cut by the ring 3 can be noted in FIGS. 5 and 6.

An essential feature of the present invention is the self-adjustment of the cutting ring 3 with respect to the bead 9 extending axially along the inside surface of the pipe 1. For example, if the inside bead 9 extends obliquely of the axial direction, or the bead is not directly vertically aligned above the axis of the pipe, see FIG. 5, it is possible to assure that a smooth surface is obtained on the inside of the pipe and that the wear of the cutting ring 3 is considerably less than experienced in known devices. The effectiveness of the removal of the bead leaving a smooth surface on the inside of the pipe is achieved, in part, due to the angular relationship between the central axis of the cutting ring and the axis of the pipe or, correspondingly, the acute angular relationship of the lower surface of the ring with the axis of the pipe as indicated by the angle A in FIG. 1. Due to this orientation of the cutting ring relative to the inside surface of the pipe, a relatively wide contact exists between the cutting ring 3 and the pipe 1. The removal of the projecting portion of the weld seam takes place with the cutting edge of the cutting ring extending in the form of a circular arc. In addition, the shape of the cutting edge matches with the inside projection or bead 9 of the weld seam so that it is possible to effect a complete removal of the projection when the cutting ring is turned about the axis of the pipe.

With the screw or clamping member 8 bearing against the outside surface of the cutting ring 3 and securing it to the carrier 6, the interior of the cutting ring can be adapted to the actual conditions involved for removing the material cut from the inside bead 9 of the weld seam. In one embodiment of the cutting ring, as shown in FIG. 7, starting from the cutting edge surface, the interior is formed by an axially extending cylindrical section 10 followed by a frusto-conical section 11. Based on the material cut from the inside bead 9 of the weld seam the frusto-conical section 11 can be provided with a different diverging slope. Note in FIG. 7 one frusto-conical section 11 is shown in full lines and another section is shown in dashed lines.

In FIG. 9 starting with the cutting edge surface end, the interior of the cutting ring 3 has a cylindrical section 10 followed by a frusto-conical section 11. Guide grooves 12 are formed in the frusto-conical section 11 extending from adjacent the cylindrical section 10 to the opposite end of the cutting ring. With this arrangement small coils of the removed material result and this cutting ring is particularly suited for internal deburring at high temperatures. In some instances it is desirable to remove a long coil of the material trimmed from the weld seam and this can be achieved with the cutting ring shown in FIG. 8. In FIG. 8, starting from the edge surface end, there is a first cylindrical section 10 followed by a frusto-conical section 13 which diverges inwardly and then reverses direction and converges inwardly to a second cylindrical section 14 located at the opposite end of the cutting ring.

Since the carrier 6 for the cutting ring is replaceable, it is possible, within a short period of time, to insert a circular ring 3 of the same or of a different diameter or with a different internal diameter, note the various shapes of the openings illustrated in FIGS. 7 to 9. If the dovetailed connection 7, note FIG. 2, between the carrier 6 and the movable part 5 of the support body 2 is designed to run obliquely in the direction of the cutting ring 3, then in most instances the connection between the two parts using a screw 15 can be eliminated, because the cutting ring carrier 6 clamps itself tightly due to the cutting pressure generated during the cutting or deburring operation.

The position of the cutting ring 6, in accordance with the invention, has been determined as a result of exhaustive testing so that the angle A, note FIG. 1, is in the range of 20° to 30°, that is, the base surface of the cutting ring opposite the cutting edge surface lies in a plane disposed at the angle A to the axis of the pipe. The angle A can be varied as a function of the cutting speed and the type of material being trimmed.

A guide roll 16 is mounted in the movable part 5 and it has a groove 17 arranged to travel along the internal projection of the weld seam while the projection is being cut. As a result, the guide roll 16 permits the cutting ring 3 to follow along the internal projection 9.

In the stationary part 4 of the support body 1, a flat spring 18 and a screw 19 are arranged so that the cutting ring 3 can be adjusted to the desired cutting position. With the device for internal deburring embodying the present invention, a structurally simplified and robust tool has been developed which is suitable for high working speeds and smooth running operation. Further, a good surface is provided on the interior of the pipe where the welded seam has been trimmed and a long service life is provided for the cutting ring 3.

While specific embodiments of the invention have been shown and described in detail to illustrate the application of the inventive principles, it will be understood that the invention may be embodied otherwise without departing from such principles.

We claim:

1. Device for the internal deburring of an axially elongated pipe or shaped tubular member having an axially extending welded seam with a portion of the welded seam projecting into the interior of the pipe or tubular member whereby the device removes the inwardly projecting portion of the welded seam in the cutting direction extending in the axial direction of the pipe or tubular member, the device includes a support body elongated in the cutting direction and arranged to be positioned in the pipe or tubular section, said support body having a first end and a second end spaced apart in the cutting direction, a cutting ring mounted on said support body adjacent the first end thereof, said cutting ring having an axis extending trasversely of the cutting direction, wherein the improvement comprises that said cutting ring on said support body is movably displaceable relative to the interior of the pipe or tubular member being deburred in the dirction extending transversely of the cutting direction during the deburring operation, said cutting edge has a cutting edge surface at one end thereof extending transversely of the axis thereof and an opposite end surface spaced from the cutting edge surface and extending transversely of the axis, an interior surface within said cutting ring extending between said cutting edge surface and said opposite end surface, said interior surface comprising a first cylindrical section extending from said cutting edge surface toward said opposite end surface, a second cylindrical section locataed at the opposite end surface and spaced axially from said first cylindrical section, a frusto-conical section extending between said first and second cylindrical sections with said frusto-conical section diverging outwardly from said first section toward said second section and then diverging inwardly to said second cylindrical section.

2. Device for the internal deburring of an axially elongated pipe or shaped tubular member having an axially extending welded seam projecting into the interior of the pipe or tubular member whereby the device removes the inwardly projecting portion of the welded seam in the cutting direction extending in the axial direction of the pipe or tubular member, the device includes a support body elongated in the cutting direction and arranged to be positioned in the pipe or tubular section, said support body having a first end and a second end spaced apart in the cutting direction, a cutting ring mounted on said support body adjacent the first end thereof, said cutting ring having an axis extending transversely of the cutting direction, wherein the improvement comprises that said cutting ring on said support body is movably displaceable relative to the interior of the pipe or tubular member being deburred in the direction extending transversely of the cutting direction during the deburring operation, said cutting ring has a first annular end surface and a second annular end surface each extending transversely of the central axis and spaced apart in the direction of the central axis, said first end surface forms a cutting edge surface with an annular cutting edge located at the radially inner edge of said cutting edge surface, said cutting edge surface is beveled outwardly from said cutting edge inclined toward said opposite second end surface, an interior surface within said cutting ring extending between the cutting edge and the opposite second end surface and extending generally in the direction of the central axis, said interior surface comprising a cylindrical section commencing at said cutting edge and extending toward said opposite second end surface and a frusto-conical section extending from said cylindrical section to the opposite second end surface with said frusto-conical section diverging outwardly from said cylindrical section toward said opposite second end surface.

3. Device, as set forth in claim 2, wherein guide grooves are formed in said frusto-conical section extending in the direction of the central axis from adjacent said cylindrical section to the opposite second end surface with said grooves arranged to act as breakers for the material trimmed from the interior surface of the pipe.

* * * * *